United States Patent [19]

Peters et al.

[11] 4,086,201

[45] Apr. 25, 1978

[54] STYRENE-BUTADIENE INTERPOLYMER LATEX BASED CEMENT ADDITIVES

[75] Inventors: James Peters; Robert D. VanDell; R. Douglas Eash; Lz F. Lamoria, all of Midland, Mich.

[73] Assignee: The Dow Chemical Company, Midland, Mich.

[21] Appl. No.: 816,052

[22] Filed: Jul. 15, 1977

[51] Int. Cl.$^2$ ................................................ C08K 3/00
[52] U.S. Cl. ........................ 260/29.7 S; 260/29.1 SB; 260/29.7 E; 260/29.7 SQ; 260/42.13
[58] Field of Search .................... 260/29.1 SB, 29.7 S, 260/29.7 SQ, 29.7 E, 42.13

[56] References Cited

U.S. PATENT DOCUMENTS

| Re. 28,722 | 2/1976 | Sanders | 260/29.7 S |
|---|---|---|---|
| 2,817,128 | 12/1957 | Wickett | 260/42.13 |
| 3,043,790 | 7/1962 | Sanders | 260/29.7 S |
| 3,640,912 | 2/1972 | Reinhard et al. | 260/42.13 |
| 3,895,953 | 7/1975 | Mehta | 260/29.6 S |
| 3,917,574 | 11/1975 | Gibbs et al. | 260/79.3 MU |
| 3,936,408 | 2/1976 | Adams et al. | 260/29.6 S |
| 3,965,032 | 6/1976 | Gibbs et al. | 260/79.3 MU |
| 4,015,991 | 4/1977 | Persinski et al. | 260/29.6 S |

*Primary Examiner*—Eugene C. Rzucidlo
*Attorney, Agent, or Firm*—Ronald G. Brookens

[57] ABSTRACT

This invention is directed to cement additives consisting essentially of (1) a styrene-butadiene interpolymer latex, (2) a nonionic surfactant, (3) a polyelectrolyte comprising the product obtained by copolymerizing methylmethacrylate and a sulfoester of α-methylene carboxylic acid or its salt, and (4) a polyorganosiloxane foam depressant, which additives provide portland cement compositions having excellent strength properties, workability and adhesion to cementitious substrates.

14 Claims, No Drawings

STYRENE-BUTADIENE INTERPOLYMER LATEX BASED CEMENT ADDITIVES

BACKGROUND OF THE INVENTION

Portland cement is one of the most widely used materials in the construction industry. Although unmodified concrete and cement mortar systems (i.e., those not containing a polymer latex modifier) have adequate properties for many construction applications, there remain many areas in which such properties, particularly strength properties, are not acceptable.

Latex-modified portland cememt systems have been developed that significantly change the physical properties of unmodified concrete and cement mortar. Of such latex-modified cement systems, the addition of styrene-butadiene polymer latexes to portland cement have provided compositions having improved strength, flexibility, adhesion, elongation at break, as well as smaller volume change. U.S. Pat. No. 3,043,790 (Re 28,722) and U.S. Pat. No. 3,895,953 are directed to such latex-modified portland cement systems.

The present invention is directed to a cement additive based on styrene-butadiene interpolymer latexes having significantly improved strength properties, workability and adhesion to cementitious substrates, e.g., to surfaces such as floors, pavements and bridge decks, cement blocks, bricks and the like.

SUMMARY OF THE INVENTION

A cement additive consisting essentially of (1) a styrene-butadiene interpolymer latex containing up to about 60 parts by weight of interpolymer solids, and, based on 100 parts of said latex polymer solids, (2) from about 3 to about 10 parts by weight of a nonionic surfactant, (3) from about 0.3 to about 10 parts by weight of a polyelectrolyte having a number average molecular weight of less than about 3000 and preferably from about 1000 to about 2000 and comprising essentially of about 3 parts by weight of methyl methacrylate and about 1 part by weight of a sulfoester of α-methylene carboxylic acid or its salt having the formula $$R-CO_2-Q-SO_3M$$

wherein the radical R is selected from the group consisting of vinyl and α-substituted vinyl, and the radical —Q— is a divalent hydrocarbon radical having its valence bond on different carbon atoms, and M is a cation, and (4) from about 0.1 to about 5 parts by weight of a polyorganosiloxane foam depressant.

DESCRIPTION OF THE PREFERRED EMBODIMENTS

The term "portland cement" is used herein to include generally the kind of product obtained by heating lime-clay mixtures, or natural cement-rock, to such a temperature that practically the entire product is sintered, followed by grinding. The product is often a mixture of dicalcium and tricalcium silicate with lesser amounts of aluminate. Various additives can be included in accordance with conventional portland cement manufacturing practices. It will be understood that various modifications such as the hydraulic cements of the kind commonly known as calcium-aluminate cements can be used as substantial equivalents for the purposes of this invention.

In many instances, it may be desirable to combine the cement compositions of this invention with an aggregate material. In this regard, the preferred aggregate material is sand, however, any particulate material may be used including stone, gravel, pebbles, granite, carborundum, marble chips, mica and the like.

By the term "styrene-butadiene interpolymer latex" as used herein is meant any aqueous colloidal dispersion of a polymer of styrene and butadiene having a styrene:butadiene weight ratio of from about 30:70 to about 70:30, as well as those interpolymers having in addition thereto up to about 10 parts by weight of at least one other monomer such as acrylonitrile. A particularly preferred interpolymer consists essentially of about 63 weight percent styrene, about 32 weight percent butadiene and about 5 weight percent of acrylonitrile. Such interpolymers can be prepared by mixing the monomeric ingredients in the proportions corresponding to the composition of the desired interpolymer, in water containing an emulsifying agent or agents, and heated with agitation in the presence of a peroxide catalyst to initiate copolymerization as known in the art.

Illustrative of nonionic surfactants are: fatty acid esters such as glycerol monostearate, diethylene glycol laurate, propylene glycol monostearate, sorbitol monolaurate and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols and alkyl phenols. Preferred are the polyoxyalkylene derivatives of propylene glycol having a molecular weight of at least about 1000 to about 15,000; and the condensation products of ethylene oxide with alkyl phenols, particularly the di-butyl-phenoxynonaoxyethylene-ethanols. The above monomeric surfactants are advantageously used in concentrations of from about 3 to about 10 and preferably from about 4 to 5 parts by weight based on 100 parts of latex polymer solids. Utilization of concentrations less than about 3 parts by weight result in latex-modified cement compositions having inadequate adhesion to cementitious material to which they are conventionally applied, whereas utilization of such surfactants in concentrations exceeding about 10 parts by weight are unnecessary and may adversely affect the flow properties of the latex-modified cement compositions.

Polyelectrolytes of the type required for use by the present invention are broadly disclosed in U.S. Pat. Nos. 3,917,574 and 3,965,032. The polyelectrolytes found to be particularly useful for the purposes of the present invention are those polyelectrolytes having a number average molecular weight up to about 3000 and preferably in the range of about 1000 to about 2000, which are prepared by copolymerization of from about 3 parts by weight of monomeric methyl methacrylate with about 1 part by weight of a monomeric sulfoester of α-methylene carboxylic acid, or its salt, having the formula $$R-CO_2-Q-SO_3M$$

wherein the radical R is selected from the group consisting of vinyl and α-substituted vinyl, and the radical —Q— is a divalent hydrocarbon radical having its valence bonds on different carbon atoms and M is a cation. A particularly preferred monomeric sulfoester is 2-sulfoethyl methacrylate or the sodium salt thereof.

The above prescribed polyelectrolytes are used in concentrations of from about 0.3 to about 10 parts by weight and preferably from about 3 to about 10, based on 100 parts of latex polymer solids, and preferably from about 3 to about 7 parts by weight, particularly when preparing latex-modified cement mortar compositions requiring optimum workability properties. Such polyelectrolytes are generally incorporated in the latex (or the cement compositions) while in the form of aqueous dispersions containing from about 25 to 50 parts by weight of polyelectrolyte solids. The polyelectrolytes, or a portion thereof, may also be added during the polymerization reaction forming the polymer latex.

Illustrative of the polyorganosiloxanes are the condensation products resulting from polymerization of organo silane diols, as represented by the formula

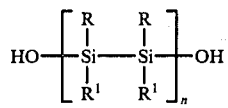

where R and R', in the above formula, represent organic radicals such as alkyl, aryl, aralkyl and alkaryl or heterocyclic groups, and $n$ is one or more. Also useful are polymerization products of organo silane diols, in the presence of an organo silane monol, and condensation products obtained from mixtures of organo silane triols, diols and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

Cement mixes are made according to the present invention by simply adding the cement additive prescribed herein to the cement with mixing and such added water as is necessary to obtain a cement mix of desired flow and working consistency. If the cement additive of the invention and portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10 percent by weight of the mineral aggregate and usually from about 15 to 30 percent of the weight of the mineral aggregate.

The concentration of the styrene-butadiene interpolymer solids in the cement composition is, however, critical for the obtainment of the desired combination of properties required by the present invention. In this regard, concentrations less than about 5 percent, based on the weight of cement used, do not provide adequate mechanical properties such as flexibility, abrasion resistance and adherence. Further, total latex solids concentrations in excess of about 25 percent based on the weight of cement may significantly reduce the mechanical properties of the composition.

The following examples, wherein all parts and percentages are by weight, serve to illustrate the concepts of the present invention.

EXAMPLE I

Part A — Preparation of Cement Additives

To a reaction vessel was added 1655 gms. of deionized water and 55.5 gms. of the trisodium salt of N-hydroxy-ethylethylenediaminetriacetic acid (as a 0.5 percent aqueous solution). The mixture was then adjusted to a pH of about 3.5 by the addition of acetic acid. The reactor was then purged with nitrogen and heated to a temperature of about 90° C. Thereafter, a monomer stream composed of 1397 gms. of styrene (about 63 wt. %), 713 gms. of butadiene (about 32 wt. %) and 111 gms. of acrylonitrile (about 5 wt. %) was added to the reactor over a 5-hour period along with a separate aqueous stream composed of (a) 670 gms. of a polyelectrolyte consisting essentially of 3 parts by weight of methyl methacrylate (MMA) and about 1 part by weight of 2-sulfoethyl methacrylate (SEM), prepared by a homogeneous, continuous monomer addition solution polymerization technique substantially as set forth in Example 3 of U.S. Pat. No. 3,965,032 (utilizing a molar ratio of MMA to SEM of about 6 to 1), (b) 18 gms. of sodium persulfate and (c) 9 gms. of sodium bicarbonate. This aqueous stream was added to the reactor over a 7-hour period. The reactor was then held at a temperature of 90° C over a period of about 2 hours and steam stripped to remove residual monomer. Thereafter, the following materials were post-added to the latex.

| Material | Amt. (pts/100 pts. of latex polymer solids) |
|---|---|
| Additional Polyelectrolyte (10% aqueous solution) | 2 |
| Nonionic surfactant (di-t-butyl-phenoxynona-oxyethylene-ethanol) | 4 |
| Polyorganosiloxane Foam Depressant (condensation product of dimethyl silane diol) | 0.04 |

The resulting cement additive contained about 48 percent polymer solids, said solids having a particle size between about 1500–1800 A.

Part B — Evaluation of Cement Additive in Cement

Cement mortar was prepared for strength testing by mixing the following ingredients in a Hobart mixer.

| | |
|---|---|
| Standard Ottawa Crystal Silica Sand | 2145 g |
| Peerless Brand Portland Cement | 715 g |
| Cement Additive | 227 g |
| H$_2$O | 130 g |

The mortar was molded into 2 in. cubes and tensile briquettes with a 1 in. square cross section in accordance with ASTM methods. The specimens were wet-cured for 24 hours, and cured in air at 75° F and 50 percent R. H. for an additional 27 days. Half the specimens were tested for compressive and tensile strength. The other half was immersed in water for 7 additional days and then tested wet. The data were compared to unmodified mortar and other mortars modified with conventional cement additives. The following Table I sets for cement additive compositions and cement strength properties.

heretofore unobtainable utilizing a cement additive based on a styrene-butadiene interpolymer latex.

TABLE I

| Cement Additive | Compressive (PSI) (ASTM C-109) | | Tensile (PSI) (ASTM C-190) | | Vicat (mm) (ASTM C-42) | Water/Cement Ratio (W/C) | Latex Solids/ Cement Ratio (L/C) |
| --- | --- | --- | --- | --- | --- | --- | --- |
| | Dry | Wet | Dry | Wet | | | |
| For Comparison | | | | | | | |
| None | 4308 | 4308 | 333 | 403 | 36 | 0.53 | 0 |
| (1) | 6223 | 5042 | 847 | 545 | 33 | 0.35 | 0.15 |
| (2) | 8008 | 6237 | 871 | 485 | 35 | 0.40 | 0.20 |
| (3) | 7700 | 5550 | 845 | 513 | 36 | 0.35 | 0.15 |
| The Invention | | | | | | | |
| (4) | 8810 | 7100 | 890 | 610 | 36 | 0.35 | 0.15 |

Notes:
(1) As per cement additive of Part A above but using sodium lauryl sulfate as a replacement for the polyelectrolyte.
(2) As per cement additive (1) above but without the polyorganosiloxane foam depressant.
(3) As per cement additive of Part A above but using the sodium salt of dodecylated sulfonated phenyl ether as a replacement for the polyelectrolyte.
(4) Cement additive of Part A (using polyelectrolyte).

EXAMPLE 2

A cement additive (1) of the composition of Part A of Example 1 was used to prepare a mortar according to the following recipe where the ingredients were mixed in a Hobart mixer.

| Material | Amt (Gms.) |
| --- | --- |
| Standard Ottawa Crystal Silica | 975 |
| Peerless Brand Type I Portland Cement | 300 |
| Piqua Marble Flour | 150 |
| Cement Additive (solids) | 48 |
| Additional water | 144 |

The above cement composition was tested for cross-brick adhesion (ASTM Test No. C-321, 7 days dry cure) wherein the cross-brick adhesion value is that value required to pull apart two bricks bonded by mortar at an angle of 90° to each other. For purposes of comparison, a cement additive (2) was also tested consisting of a latex of 75 parts by weight vinylidene chloride/20 parts by weight vinyl chloride/5 parts by weight ethylacrylate/and 2 parts by weight of methyl methacrylate. Such cement additive is known as SARABOND ® latex mortar additive, which is conventionally used in the construction industry. The following Table II sets forth cement additive compositions and cross-brick adhesion values.

EXAMPLE 3

A cement additive (2) containing 66 weight percent styrene and 34 weight percent butadiene was prepared and formulated as in Part A of Example 1. Mortar was prepared and tested as in Part B of Example 1 and the results compared to those found for a cement additive (1) of the same composition, except that it contained a conventional surfactant (sodium lauryl sulfate) in place of the prescribed polyelectrolyte. The following Table III sets forth cement additive composition and cement strength properties.

The above data illustrate the unexpected increase in compressive and tensile strength of cement compositions obtained by utilization of the cement additives containing the polyelectrolytes prescribed by the present invention.

TABLE III

| | Compressive Strength (psi) ASTM C-109 | | Tensile Strength (psi) ASTM C-109 | | Vicat (mm) ASTM C-42 | Water/Cement Ratio (W/C) | Latex Solids/ Cement Ratio (L/C) |
| --- | --- | --- | --- | --- | --- | --- | --- |
| Latex | Dry | Wet | Dry | Wet | | | |
| For Comparison | | | | | | | |
| (1) | 6060 | 4683 | 897 | 588 | 35 | 0.35 | 0.15 |
| The Invention | | | | | | | |
| (2) | 6888 | 5287 | 1017 | 581 | 42.5 | 0.375 | 0.15 |

EXAMPLE 4

A cement additive containing 68 parts by weight styrene and 32 parts by weight butadiene was prepared as per Part A of Example 1 utilizing the polyelectrolyte at a level of 4 parts/100 parts of latex solids. Additional polyelectrolyte was then added, in one percent increments, and the resulting cement additives evaluated for workability and stability by preparing a cement paste of 282 gms portland cement, 150 gms Piqua Marble Flour, 123 gms cement additive, and heated water (120° F)

TABLE II

| Cement Additive | Cross-Brick Adhesion (psi) | Vicat (mm) (ASTM C-42) | Water/Cement Ratio (W/C) | Latex Solids/ Cement Ratio (L/C) |
| --- | --- | --- | --- | --- |
| For Comparison | | | | |
| (2) | 150 | 63 | .55 | 0.20 |
| The Invention | | | | |
| (1) | 158 | 65 | .48 | 0.16 |

The above data illustrate the highly beneficial adhesion values obtainable with the cement additives prescribed by the present invention. This result has been sufficient to give the proper consistency. This consistency is that which corresponds to about 80 percent of full scale deflection of the recorder chart pen when the paste is tested using a Brabender Viscocorder at 25 rpm and using a 125 g-cm torque spring.

Workability factor is the ratio of the torque reading after the machine is turned off, so that there is no rotation, and the recorder pen is at rest, to the reading when the cup is rotating, when the reading is about 80 percent of the full scale deflection.

The stability is tested by making a paste at the same consistency as used for the workability test. This mix is placed into a water bath at 100° F, and the Brabender Viscocorder is now run with a 500 g-cm torque spring at 25 rpm. The time for the initial torque reading to double is taken as the stability in minutes.

The following Table IV sets forth the concentration of polyelectrolyte used and the workability and stability values for the cement mortar compositions.

TABLE IV

| Polyelectrolyte Concentration (pts/100 pts of latex solids) | Workability Factor | Stability (Minutes) |
| --- | --- | --- |
| 4 | 0.3 | <5 |
| 5 | 0.57 | 22 |
| 6 | 0.67 | >30 |
| 7 | 0.63 | >30 |

EXAMPLE 5

A cement additive was prepared as described in Part A of Example 1 and was used in preparing a modified concrete mix, following mix design practices suitable for bridge deck resurfacing. The following Table V sets forth the composition of the modified concrete mixes and the compressive strength (after 28 days cure of 3 inch cylinders), slump characteristics and percent air values of each mix.

TABLE V

| Cement Additive | Cement:Sand: Stone | Latex Solids/ Cement (L/C) | Water/ Cement (W/C) | Slump (in.) | Air (%) | Compressive Strength (psi) (ASTM C-109) |
| --- | --- | --- | --- | --- | --- | --- |
| For Comparison | | | | | | |
| None (1) | 1:2 . 5:2 | 0 | 0.41 | 2.5 | 7.5 | 6,020 |
| (2) | 1:2 . 5:2 | 0.15 | 0.307 | 3.0 | 4.1 | 6,294 |
| (3) | 1:1 . 69:1 . 69 | 0 | 0.314 | ¾ | 5.8 | 6,436 |
| The Invention | | | | | | |
| (4) | 1:2 . 5:2 | 0.15 | 0.301 | 2.8 | 4.1 | 7,383 |

(1) air-entrained concrete control (no cement additive)
(2) Cement additive of Part A of Example 1 but using sodium lauryl sulfate as replacement for the polyelectrolyte
(3) Iowa Low Slump System
(4) Cement additive of Part A of Example 1.

While it is generally convenient to prepare the cement additive by precombining the styrene-butadiene interpolymer latex, nonionic surfactant, polyelectrolyte and polyorganosiloxane antifoamer in the manner as specifically set forth herein, and then introducing the resulting mixture into the cement, cement-sand, or cement-sand-coarse aggregate mixture, it will be understood that it is not necessary that all the various components of the additive be so premixed. For example, substantially equivalent cement, mortar or concrete mixes are obtained by separate addition of the requisite quantities of the polymer latex (containing sufficient anionic surfactant to avoid coagulation thereof), the polyelectrolyte and/or the nonionic polyorganosiloxane foam depressant.

What is claimed is:

1. A cement additive consisting essentially of (1) a styrene-butadiene interpolymer latex, said latex containing up to about 60 parts by weight of interpolymer solids, and, based on 100 parts of said latex polymer solids; said styrene-butadiene interpolymer has a styrene to butadiene weight ratio of from about 30:70 to about 70:30; (2) from about 3 to about 10 parts by weight of a nonionic surfactant, (3) from about 0.3 to about 10 parts by weight of a polyelectrolyte having a number average molecular weight of less than about 3000 consisting essentially of about 3 parts by weight of methyl methacrylate and about 1 part by weight of a sulfoester of -methylene carboxylic acid or its salt having the formula

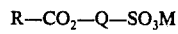

$$R-CO_2-Q-SO_3M$$

wherein the radical R is selected from the group consisting of vinyl and —-substituted vinyl, and the radical —Q— is a divalent hydrocarbon radical having its valence bonds on a different carbon atom, and M is a cation, and (4) from about 0.1 to about 5 parts by weight of a polyorganosiloxane foam depressant.

2. The cement additive of claim 1 wherein said styrene-butadiene interpolymer contains up to about 10 parts by weight of acrylonitrile.

3. The cement additive of claim 2 wherein said styrene-butadiene interpolymer consists essentially of about 63 weight percent styrene, about 32 weight percent butadiene and about 5 weight percent acrylonitrile.

4. The cement additive of claim 3 wherein said nonionic surfactant is a di-butyl-phenoxynonaoxyethyleneethanol.

5. The cement additive of claim 4 wherein said nonionic surfactant is di-t-butyl-phenoxynonaoxyethyleneethanol.

6. The cement additive of claim 5 wherein said monomeric sulfoester of α-methylene carboxylic acid or its salt is 2-sulfoethyl methacrylate or the sodium salt thereof.

7. The cement additive of claim 6 wherein said polyorganosiloxane foam depressant is a condensation product of dimethyl silane diol.

8. A latex-modified portland cement composition comprising a mixture of portland cement and a cement additive comprising (1) a styrene-butadiene interpolymer latex containing up to about 60 parts by weight of interpolymer solids, said latex being present in an amount sufficient to provide from about 5 to about 25 parts by weight of latex polymer solids based on the weight of cement, and, based on 100 parts of said latex polymer solids; said styrene-butadiene interpolymer has a styrene to butadiene weight ratio of from about 30:70 to about 70:30; (2) from about 3 to about 10 parts by weight of a nonionic surfactant, (3) from about 0.3 to about 10 parts by weight of a polyelectrolyte having a number average molecular weight of less than about 3000 consisting essentially of about 3 parts by weight of methyl methacrylate and about 1 part by weight of a sulfoester of a -methylene carboxylic acid or its salt having the formula

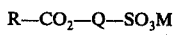

wherein the radical R is selected from the group consisting of vinyl and -substituted vinyl, and the radical —Q— is a divalent hydrocarbon radical having its valence bonds on a different carbon atom, and M is a cation, and (4) from about 0.1 to about 5 parts by weight of a polyorganosiloxane foam depressant.

9. The latex-modified portland cement composition of Claim 8 wherein said styrene-butadiene interpolymer contains up to about 10 parts by weight of acrylonitrile.

10. The latex-modified portland cement composition of claim 9 wherein said styrene-butadiene interpolymer consists essentially of about 63 weight percent styrene, about 32 weight percent butadiene and about 5 weight percent acrylonitrile.

11. The latex-modified portland cement composition of claim 10 wherein said nonionic surfactant is a di-butyl-phenoxynonaoxyethylene-ethanol.

12. The latex-modified portland cement composition of claim 11 wherein said nonionic surfactant is di-t-butyl-phenoxynonaoxyethylene-ethanol.

13. The latex-modified portland cement composition of claim 12 wherein said monomeric sulfoester of $\alpha$-methylene carboxylic acid or its salt is 2-sulfoethyl methacrylate or the sodium salt thereof.

14. The latex-modified portland cement composition of claim 13 wherein said polyorganosiloxane foam depressant is a condensation product of dimethyl silane diol.

* * * * *